(12) United States Patent
Ito et al.

(10) Patent No.: US 9,307,742 B2
(45) Date of Patent: Apr. 12, 2016

(54) EXCREMENT TREATMENT MATERIAL

(71) Applicant: Hiroshi Ito, Tokyo (JP)

(72) Inventors: Hiroshi Ito, Tokyo (JP); Shinobu Hatanaka, Tokyo (JP); Junji Yoshinaga, Tokyo (JP)

(73) Assignee: Hiroshi Ito, Tokyo (JP)

( * ) Notice: Subject to any disclaimer, the term of this patent is extended or adjusted under 35 U.S.C. 154(b) by 0 days.

(21) Appl. No.: 14/204,703

(22) Filed: Mar. 11, 2014

(65) Prior Publication Data

US 2014/0190420 A1 Jul. 10, 2014

Related U.S. Application Data

(63) Continuation of application No. PCT/JP2012/060366, filed on Apr. 17, 2012.

(30) Foreign Application Priority Data

Dec. 28, 2011 (JP) ................................ 2011-289777

(51) Int. Cl.
*A01K 1/015* (2006.01)

(52) U.S. Cl.
CPC ................... *A01K 1/0155* (2013.01)

(58) Field of Classification Search
CPC .................................................. A01K 1/0155
USPC ............................................................. 119/172
See application file for complete search history.

(56) References Cited

U.S. PATENT DOCUMENTS

| | | | |
|---|---|---|---|
| 6,294,118 B1 * | 9/2001 | Huber et al. | 264/118 |
| 6,371,050 B1 | 4/2002 | Mochizuki | |
| 2002/0000207 A1 | 1/2002 | Ikegami et al. | |
| 2005/0005870 A1 * | 1/2005 | Fritter et al. | 119/173 |
| 2007/0065397 A1 * | 3/2007 | Ito et al. | 424/76.2 |
| 2008/0022940 A1 * | 1/2008 | Kirsch et al. | 119/173 |
| 2008/0029039 A1 * | 2/2008 | Jenkins | 119/173 |
| 2008/0251027 A1 * | 10/2008 | Kirsch et al. | 119/173 |

(Continued)

FOREIGN PATENT DOCUMENTS

| | | |
|---|---|---|
| CN | 1269486 A | 10/2000 |
| JP | 2002-300823 A | 10/2002 |
| JP | 2006-075172 A | 3/2006 |

(Continued)

OTHER PUBLICATIONS

May 22, 2012 Written Opinion issued in International Application No. PCT/JP2012/060366 (with partial translation).

(Continued)

*Primary Examiner* — Monica Williams
*Assistant Examiner* — Jessica Wong
(74) *Attorney, Agent, or Firm* — Oliff PLC

(57) ABSTRACT

The present invention provides an excrement treatment material capable of being treated by a water-disintegration treatment after use. The excrement treatment material contains a water retaining material including at least one material of papers, fibers, woods, plants, plastics, rubbers, organic sludge and animal waste, an adhesive and a water absorbing resin, and is formed in a granular shape, wherein the water retaining material has a grain size of 0.6 mm or less, and the adhesive is contained in an amount of 5 wt % to 20 wt % with respect to a total weight of the excrement treatment material.

4 Claims, 1 Drawing Sheet

(56) References Cited

U.S. PATENT DOCUMENTS

2009/0036855 A1* 2/2009 Wada et al. .................. 604/372
2009/0217882 A1* 9/2009 Jenkins ........................ 119/173

FOREIGN PATENT DOCUMENTS

| JP | A-2006-101714 | 4/2006 |
| JP | 2007-129975 A | 5/2007 |
| JP | A-2007-190026 | 8/2007 |
| JP | 2009-273418 A | 11/2009 |
| JP | A-2009-284881 | 12/2009 |
| JP | 2010-104383 A | 5/2010 |

OTHER PUBLICATIONS

May 22, 2012 International Search Report issued in International Application No. PCT/2012/060366.

Nov. 27, 2014 Office Action issed in Chinese Application No. 201280052719.9.

Extended European Search Report issued in European Patent Application No. 12861585.3 dated Jun. 26, 2014.

Oct. 27, 2015 Office Action issued in Japanese Patent Application No. 2013-551491.

Feb. 2, 2016 Office Action issued in Japanese Application No. 2013-551491.

* cited by examiner

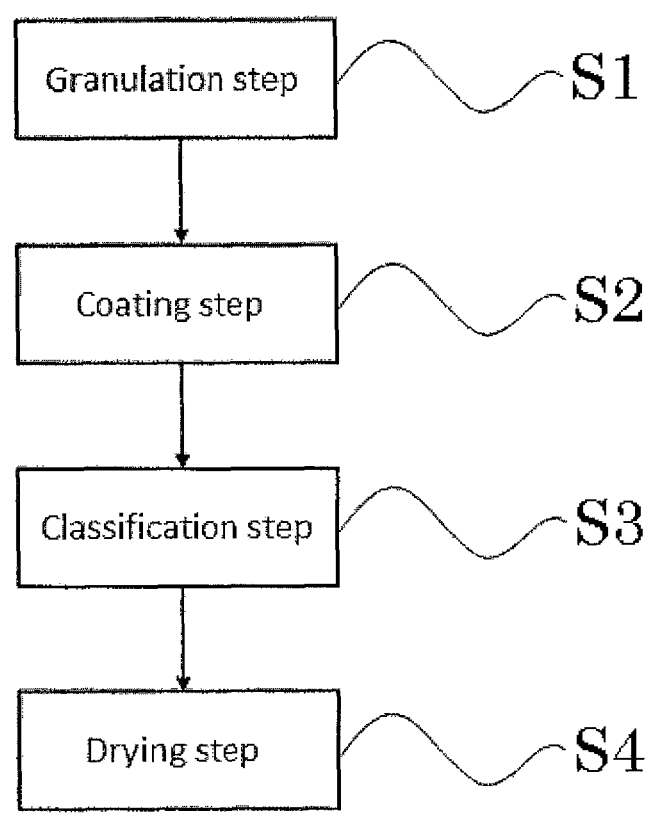

EXCREMENT TREATMENT MATERIAL

CROSS REFERENCE TO RELATED APPLICATION

This is a Continuation of International Application No. PCT/JP2012/060366 filed Apr. 17, 2012, which claims the benefit of Japanese Application No. 2011-289777 filed Dec. 28, 2011. The disclosures of the prior applications are hereby incorporated by reference herein in their entirely.

TECHNICAL FIELD

The present invention relates to an excrement treatment material for absorbing excrement of humans or animals (hereinafter, referred to as merely an "excrement treatment material").

BACKGROUND

Recently, an excrement treatment material for treating excrement of pet animals and the like has come to be known. As an example of such an excrement treatment material, the inventors of the present invention have already developed an excrement treatment material having a core portion that is formed by granulation of various waste materials such as papers and a coating layer portion that contains 0.1 wt % or more of fibrous waste material and the like and coats the core portion. This excrement treatment material exhibits an action of causing grains of the excrement treatment material, which are wet from excrement such as urine, to adhere to each other so as to form an aggregate and enabling the used excrement treatment material to be easily removed (Patent Literature 1).

CITATION LIST

Patent Literature

[Patent Literature 1] JP 2007-190026A

SUMMARY OF INVENTION

Technical Problem

However, although the conventional excrement treatment material becomes an aggregate, and a handling thereof after use is facilitated, the conventional excrement treatment material is difficult to disperse and disintegrate when being flushed down a flush toilet or the like. Therefore, since the conventional excrement treatment material has to be disposed of by burning or discarded when being treated and has to be stored for a certain period of time even after use, there is a possibility of an unpleasant odor or the like occurring.

Solution to Problem

The present invention provides an excrement treatment material capable of being treated by a water-disintegration treatment (water-dispersion treatment) in a flush toilet after use.

The excrement treatment material of the present invention contains a water retaining material including at least one material of papers, fibers, woods, plants, plastics, rubbers, organic sludge and animal waste; an adhesive; and a water absorbing resin, and is formed in a granular shape, wherein the water retaining material has a grain size of 0.6 mm or less (preferably 0.3 mm or less), and the adhesive is contained in an amount of 5 wt % to 20 wt % (more preferably 10 wt % to 20 wt %) with respect to a total weight of the excrement treatment material.

Moreover, the excrement treatment material of the present invention contains a granular core portion containing a water retaining material including at least one material of papers, fibers, woods, plants, plastics, rubbers, organic sludge and animal waste, and a coating layer portion containing an adhesive and a water absorbing resin for covering the granular core portion, wherein the water retaining material has a grain size of 0.6 mm or less (preferably 0.3 mm or less), and the adhesive is contained in an amount of 5 wt % to 20 wt % (more preferably 10 wt % to 20 wt %) with respect to a total weight of the excrement treatment material.

Here, the water retaining material refers to any one of various materials having a water retaining performance (more preferably having a water absorbing performance).

Moreover, it is more preferable to use various waste materials as the foregoing papers, fibers, woods, plants (including plant residue), plastics, and rubbers, because a cost for manufacturing the excrement treatment material can be reduced.

Moreover, it is more preferable that the excrement treatment material of the present invention contains a water retaining material including at least one material of paper powder, bean curd lees and wood powder; dextrin; and a water absorbing resin, and is formed in a granular shape, wherein the water retaining material has a grain size of 0.6 mm or less, and the dextrin is contained in an amount of 5 wt % to 20 wt % with respect to a total weight of the excrement treatment material.

Furthermore, it is more preferable that the excrement treatment material of the present invention contains a granular core portion containing a water retaining material including at least one material of paper powder, bean curd lees and wood powder, and a coating layer portion containing dextrin and a water absorbing resin for covering the granular core portion, wherein the water retaining material has a grain size of 0.6 mm or less, and the dextrin is contained in an amount of 5 wt % to 20 wt % (more preferably 10 wt % to 20 wt %) with respect to a total weight of the excrement treatment material.

It should be noted that the present invention defines the grain size of the water retaining material and it is required that all of the component materials including the adhesive and the water absorbing resin have a grain size of 0.6 mm or less (their preferable ranges are the same).

The invention described above has variations, which have a single-layer structure or a multi-layer structure with a coating layer, but the basic concept of the variations of the invention is identical. That is, in the present invention, a water retaining material is formed into fine granules with a grain size of 0.6 mm or less, an adhesive is used and the amount of the adhesive is set to 5 wt % to 20 wt %, which is the minimum amount required for retaining the shape after granulation and exhibiting an adhesive action after use, with respect to the total weight of the excrement treatment material, so that a structure in which the binding power of the grains is easily reduced by the grains being stirred by the force of a water flow can be obtained. Accordingly, since the granules can easily disintegrate in a short time to be in a water-disintegration state (fibers or granules bonded to each other are quickly separated and dispersed in water by coming in contact with water), the excrement treatment material can be treated by being flushed down a flush toilet soon after use.

Advantageous Effects of the Invention

With the present invention, it is possible to provide an excrement treatment material capable of being treated by a water-disintegration treatment after use.

BRIEF DESCRIPTION OF DRAWINGS

FIG. 1 is a flowchart showing a method for producing an excrement treatment material of the present invention.

DESCRIPTION OF EMBODIMENTS

One aspect (hereinafter, referred to as an "embodiment") of carrying out the present invention will now be described in detail with reference to the drawing, using a granular excrement treatment material for treating excrement for a pet animal such as a cat or a dog as an example.

[Excrement Treatment Material]

The excrement treatment material of the present embodiment has a multi-layer structure including a granular core portion for absorbing moisture from outside and a coating layer portion having a specific thickness and coating the surface of the granular core portion.

<Granular Core Portion>

It is sufficient that the granular core portion is formed in a pellet shape, and the granular core portion does not have to be, for example, perfectly spherical. The shape thereof can be columnar (elongated), flat, or the like, but is not limited thereto.

For the granular core portion, at least one material of papers, fibers, woods, plants, plastics, rubbers, organic sludge, and animal waste (hereinafter, component materials of the granular core portion are sometimes collectively referred to as a "core portion material") can be used as long as the material is a water retaining material having a water retaining performance. However, in particular, a preferable water retaining material for exhibiting a favorable water-disintegrating performance includes at least one material of paper powder, bean curd lees, and wood powder, as will be described below.

There is no limitation on types of the foregoing papers as long as pulp is used as a raw material, and various waste materials and the like can be used, as well as virgin pulp. Examples thereof include thin paper waste, sanitary paper waste, toilet paper waste, tissue paper waste, facial paper waste, cleaning paper waste, cellulose wadding waste, paper towel waste, toilet seat paper waste, newspaper scraps, magazine scraps, buffing powder (fine paper powder mainly generated when books are cut or shaved in bookbinding in printing companies), mechanical pulp waste, chemical pulp waste, titanium paper waste, semi-chemical pulp waste, cotton-like pulp waste, wood pulp waste, pulverized products of waste paper pulp, fluff pulp, water absorbing fiber waste, nonwoven fabric waste, paper powder generated in nonwoven fabric production, paper powder generated in papermaking process or paper powder generated in sanitary material production, laminated paper waste, printing scraps of laminated paper, edge scraps of laminated paper, cardboard scraps, waste paper (trim loss generated in sanitary material manufacturers, nonwoven fabric and the like, and paper scraps in general generated in paper manufacturers), wrapping paper, paperboard, used tickets, and punched-out scraps.

The foregoing fibers are thread-like materials serving as raw materials of fabrics and the like, and it does not matter whether the type thereof is a natural fiber or a chemical fiber. Examples thereof include fiber waste (such as cotton waste, wool waste, linen waste, thread waste, fabric waste, cotton refuse, cocoon waste, rayon waste, nylon waste, polyester waste, and rope waste) discarded from textile mills.

There is no limitation on types of woods, and examples thereof include various wood waste (such as wood waste of structures, wood waste related to wood product manufacturers or the like, wooden furniture, wood pallets, wood shavings, sawdust, barks, packing material waste, pieces of boards, chip waste, cut wood or cut roots, pruned branches, and wood powder).

There is no limitation on types of plants, and plant residue and the like can be used, as well as bamboo grass, bamboo, fallen leaves, and cut grass. Here, plant residue refers to unnecessary solid substances obtained from plants used as raw materials in food manufacturers, drug manufacturers, flavoring manufacturers, restaurants, or the like, and examples thereof include sauce dregs, soy sauce dregs, koji dregs, sake lees, beer lees, candy pomace, laver refuse, starch pulp, bean curd cake, bean curd lees, red bean pomace, used tea leaves, extraction residue of roasted coffee beans, rice flour or wheat flour, soy bean cake, peel or seeds of fruits, plant scraps, medicinal herb pomace, and oil cake.

Also, there is no limitation on types of plastics as long as they are solid synthetic macromolecular compounds (such as polypropyrene, vinyl chloride, polychlorinated biphenyl, polystyrene, polyacetal, polycarbonate, polyethylene, polyamide, polyethylene telephthalate, vinylidene chloride, acrylic resin, polyurethane (urethane foam) and the like, as well as biodegradable plastics and other types), and various waste materials can be used. That is, examples thereof include plastic waste, polyurethane waste, styrol waste (including styrene foam), agricultural film waste, waste of various synthetic resin packing materials, photographic film waste, waste of plastic containers, waste of coating of electric wires, waste of linings, polymer waste, slag of paint, slag of adhesive, and baekeland waste (such as printed circuit boards).

Also, plastic-rich products separated from the waste of excrement treatment materials, plastic-rich products separated from paper diaper waste (such as exterior bodies of defective paper diapers produced by sanitary material manufacturers), plastic-rich products separated from sanitary napkin waste, plastic-rich products separated from paper diaper waste, plastic-rich products separated from sanitary napkin waste, plastic-rich products separated from breast pad waste, plastic-rich products separated from sweat pad waste, plastic-rich products separated from incontinence pad waste, plastic-rich products separated from animal sheet waste, plastic-rich products separated from the waste of sheets for bedding by classification or the like, plastic-rich products separated from mask waste, plastic-rich products separated from eye mask waste, plastic-rich products separated from the waste of head covers for seats, waste of vinyl chloride wall papers, plastic-rich products separated from pillowcase waste, or the waste of synthetic resin fiber can be used.

Also, the waste of excrement treatment materials, paper diaper waste, sanitary napkin waste, breast pad waste, sweat pad waste, incontinence pad waste, animal sheet waste, the waste of sheets for bedding, mask waste, eye mask waste, the waste of head covers for seats, pillowcase waste and the like can be used.

Particularly, since ash content is contained in plastics in little amount, it is possible to reduce the volume thereof after incineration and increase the calorific value during incineration. Therefore, plastics are preferable for a case where incineration is adopted as a final disposal method of sludge after water-disintegration.

It does not matter whether the type of rubber is natural rubber or synthetic rubber as long as it is a macromolecular material having excellent stretchability, and various waste materials can be used. Examples thereof include tire waste and synthetic rubber waste.

Organic sludge is a muddy material remaining after industrial waste water is treated and is a muddy material produced during the production processes in various manufacturing industries, and all of the organic and inorganic materials can be used. Examples thereof include paper making sludge, pulp sludge, sewage sludge, digestion sludge (surplus sludge), and paste dregs.

Animal waste refers to unnecessary substances obtained from animals used as raw materials in food manufacturers, drug manufacturers, leather manufacturers, restaurants, or the like, and it does not matter whether the type thereof is leather or a bone.

Although one of the water retaining materials may be used as the foregoing core portion material, there is a case where a water retaining performance can be effectively enhanced, by selecting two or more of the water retaining materials with different properties as appropriate, due to a synergistic effect of the water retaining materials.

For example, combinations of various materials such as a combination of fluff pulp (paper) and plant residue (e.g., bean curd lees), a combination of fluff pulp (paper), plant residue (e.g., bean curd lees) and wood (wood powder), a combination of fluff pulp (paper), plant residue (e.g., bean curd lees) and organic sludge (pulp sludge), a combination of plant residue (e.g., bean curd lees) and organic sludge (pulp sludge), and a combination of plastics (vinyl chloride wall paper) and organic sludge (pulp sludge) are preferable.

On the other hand, even if a water retaining performance is not always sufficient, there is a case where, by using two or more of the water retaining materials, one water retaining material can cover the water retaining performance of the other water retaining materials. In this case, materials that have not been necessarily used conventionally as a water retaining material can be used effectively.

Moreover, there is no problem in terms of solubility even if the core portion material contains inorganic materials such as inorganic waste, bentonite, and zeolite, but it is preferable that a content amount thereof is small from the viewpoint of the sewage treatment.

It should be noted that it is also possible to blend materials capable of exhibiting other actions, such as deodorizing materials, deodorant materials, substances having sterilizing effects, colored substances, and testing indicators, to the core portion material.

All of the foregoing core portion materials need to be pulverized to granules with a grain size of 0.6 mm or less, and more preferably 0.3 mm or less for use in order to satisfy the same quality having the reference value of "defibration capability" (within 100 seconds) as toilet paper.

<Coating Layer Portion>

The primary purpose of providing the coating layer portion is to retain the shape after granulation and exhibit an adhesive action after use, and it is preferable to use a mixture of an adhesive, a water absorbing resin and paper powder (hereinafter, component materials of the coating layer portion are sometimes collectively referred to as a "coating material").

Various known materials can be used as the foregoing adhesive, and examples thereof include starch adhesives, phenol resin-based adhesives, and vinyl acetate resin emulsion adhesives. Examples of the starch adhesives that functions as such an adhesive include starches such as potato starch, wheat starch, sweet potato starch, corn starch, tapioca starch, rice starch, dextrin, and gelatinized (a) forms of these starches, acrylamide, PVA, carboxymethylcellulose, and sodium alginate, and two or more of these materials can be used in combination. Examples of other adhesives include sodium polyacrylate, vinyl ester, bentonite, pullulan, casein, and gelatin, and these materials will be used alone or in combination of two or more.

It is particularly preferable that the adhesive is a water-soluble adhesive in order to secure a dispersibility or disintegration property thereof by water flow, and dextrin is most preferable because it has high hydrophilicity and quickly dissolves in water.

The foregoing water absorbing resin is a resin having a water absorbing performance such as polymer, CMC, and polyvinyl alcohol (PVA). Particularly, the polymer is a water absorbing resin having a high water absorbing performance.

The pulverized papers described in the section discussing the component materials of the granular core portion can be used as the paper powder.

All of the foregoing coating materials need to be pulverized to granules with a grain size of 0.6 mm or less, and more preferably 0.3 mm or less for use in order to satisfy the same quality having the reference value of "defibration capability" (within 100 seconds) as toilet paper.

It should be noted that if the granular core portion is originally colored, it is possible to cause an action of hiding the color of the granular core portion to be exhibited before use by mixing coloring matters or the like to the coating material and covering the periphery of the granular core portion.

Also, it is possible to add a penetrating agent or a swelling agent to the coating material. Well-known materials such as various surfactants can be used as the penetrating agent, and well-known materials such as cellulose-based swelling agents can be used as the swelling agent.

<Constitution Ratio and the Like of Granular Core Portion and Coating Layer Portion>

It is most preferable that the excrement treatment material contains the granular core portion in a constitution ratio of 70 wt % to 85 wt % and the coating layer portion in a constitution ratio of 30 wt % to 15 wt % in view of the relationship between the size of the granular core portion, and the thickness of the coating layer portion.

Moreover, the excrement treatment material can easily disintegrate and dissolve in water by finely granulating all of the component materials and using the adhesive in a minimum required amount for retaining the shape after granulation and exhibiting an adhesive action after use.

More specifically, as a result of the intensive studies by the inventors of the present invention, the foregoing action can be achieved by pulverizing all of the component materials to granules with a grain size of 0.6 mm or less, and more preferably 0.3 mm or less for use and using the adhesive in an amount of 5 wt % to 20 wt % (more preferably 10 wt % to 20 wt %) with respect to the total weight of the excrement treatment material.

It should be noted that if the amount of the adhesive is too large, it is impossible to blend the water absorbing resin and the like and allow the original performance of the excrement treatment material to be exhibited, and therefore, the foregoing maximum amount of the adhesive is defined at 20 wt %.

[Production Method]

Next, the method for producing an excrement treatment material of the present invention is described with reference to FIG. 1.

The method for producing an excrement treatment material of the present invention includes a granulation step (S1), a coating step (S2), a classification step (S3), and a drying step (S4).

(1) Granulation Step (S1)

This step is for forming a granular core portion.

In this step, the core portion materials such as papers, fibers, woods, plants, plastics, rubbers, organic sludge, and animal waste are pulverized with a crusher so as to have a specific size, and the pulverized core portion materials are placed in a mixer and mixed such that specific proportions are attained. Then, water is added to increase the moisture content, and then the core portion materials are subjected to extrusion granulation. In this manner, a granular core portion forming operation is performed.

The coating material adheres to the periphery of the granular core portion due to moisture present in the granular core portion. Therefore, when the moisture content of the granular core portion before formation of the coating layer portion is less than the lower limit, the coating materials do not adhere to the periphery of the granular core portion. That is, it is not preferable that the moisture content of the granular core portion is less than 20 wt %, because the coating layer portion, which has a specific thickness necessary for exhibiting a specific action, is not formed, and as a result, no multi-layer excrement treatment material is formed, separation of the coating layer portion occurs, no aggregate is created after use, and the appearance is poor.

On the other hand, it is not preferable that the water content of the granular core portion exceeds 40 wt %, because moisture of the granular core portion excessively leaches out into the coating layer portion during the formation of the coating layer portion, and thus the thickness of the coating layer portion increases or the drying step described below takes time.

Accordingly, when performing the foregoing extrusion granulation, it is preferable to adjust the moisture content so as to be 20 wt % to 40 wt % (more preferably 20 wt % to 25 wt %).

(2) Coating Step (S2)

This step is for forming the coating layer portion by coating the periphery of the granular core portion with the foregoing coating material. In this step, the coating material is sprayed around the granular core portion using a coating device or the like to form the coating layer portion. In this manner, an operation for producing a multi-layer excrement treatment material is performed.

(3) Classification Step (S3)

This step is for classifying granules of the excrement treatment material so as to have a specific size.

In this step, the excrement treatment material produced in the previous step is sifted with a sieve having a specific mesh size to separate products that do not have a specific size. In this manner, an operation for obtaining only the products that have a specific size is performed.

(4) Drying Step (S4)

This step is for drying the obtained excrement treatment material having a specific size using a dryer.

If the moisture content of the granular core portion is high during storage of the excrement treatment material, the moisture causes the growth of mold and the like for an extended period of time. Therefore, in this step, the excrement treatment material is dried such that the water content thereof is 3 wt % or more and 10 wt % or less.

[Functional Effects]

The excrement treatment material of the present embodiment absorbs the urine excreted by a pet animal, so that the wet excrement treatment materials adhere to each other to form an aggregate by the action of the adhesive in the coating layer portion. When a user has to discard the aggregated excrement treatment materials, it is possible to treat the aggregated excrement treatment materials by a water-disintegration treatment in a short time, the aggregated excrement treatment materials being constituted by materials whose binding power is easily reduced by water flow (water pressure) of a flush toilet and satisfying the same quality having the reference value of the defibration capability as toilet papers defined in JISP4501 because the minimum required amount of the water-soluble adhesive is used and, furthermore, all of the component materials is finely granulated so as to have a grain size of 0.6 mm or less. Accordingly, the excrement treatment materials can be treated by being flushed down a flush toilet soon after use and effectively prevent an unpleasant odor or the like, due to the storage of the excrement treatment material after the urination, from occurring.

Other Embodiments of the Present Invention

In the foregoing embodiment of the present invention, a two-layer excrement treatment material having the granular core portion and the coating layer portion has been described. However, an excrement treatment material may have a single layer structure having no coating layer portion. In this case, the excrement treatment material is formed by kneading the foregoing core portion materials and coating materials (a grain size and a constitution ratio of the core portion material and the coating material are the same as described above) to form in a granular shape.

It should be noted that even if the excrement treatment material has a single-layer structure, the same action in which the coating material absorbs excreted urine to form an aggregate after use as the two-layer excrement treatment material is exhibited.

So far, one preferable embodiment has been described, but the present invention is not limited to that embodiment, and design modifications can be suitably performed without departing from the scope of the present invention. In the present embodiment, a description has been provided using a production method of an excrement treatment material for treating excrement for pet animals as an example. Needless to say, however, the water absorbing material may be applied to humans and to other animals.

EXAMPLES

In order to investigate a performance of the excrement treatment material of the present invention, samples described below were produced (based on the production method described above) to perform a dissolution test (test on defibration capability) (hereinafter, referred to as the "present test").

1. Test Method

Although a dissolution test is based on the test method for measuring the defibration capability of toilet paper defined in JISP4501, the excrement treatment material has a granular shape and is different from toilet paper having a paper piece-like shape, and therefore, the test was performed with a certain modification.

First, a 300 ml beaker containing 300 ml of water (water temperature is 20° C.) was placed on a magnetic stirrer (Magnetic Stirrer HS-1D manufactured by AS ONE corporation), a rotation rate of a stirring bar was set to 600 rpm, 0.4 g of the excrement treatment material serving as a sample was placed into the water and stirred for 90 seconds, and a degree of disintegration was checked visually.

2. Sample

Samples used in the present test were multi-layer excrement treatment materials having a granular core portion and a coating layer portion, and the weight ratio of the materials included in the granular core portion with respect to those of the coating layer portion was 70% to 30%, respectively. Moreover, the component materials described below included in the granular core portion and the coating layer portion were the same among the samples (but, the blending ratio of dextrin was different).

(1) Granular Core Portion

The component material of the granular core portion was wood powder, and six types thereof obtained by varying the grain size of the pulverized products from 1.1 mm to 0.6 mm by 0.1 mm were used (it should be noted that when the present test was performed using bean curd lees only, a mixture of bean curd lees and wood powder, and a mixture of bean curd lees, wood powder and pulverized pulp, the same results were obtained, and therefore, the description is omitted).

(2) Coating Layer Portion

Substrate contained paper powder, sodium polyacrylate (water absorbing resin) and dextrin (adhesive). Eighteen samples in total obtained by setting the blending proportion of the paper powder with respect to the sodium polyacrylate (water absorbing resin) to 3:1 in a weight ratio and varying the amount of the dextrin from 4 wt % to 21 wt % by 1 wt % with respect to the total weight of the excrement treatment material were used (108 samples were produced in total).

3. Results of the Present Test

As a result of the present test, the samples containing the wood powder serving as a component material of the granular core portion, with a grain size of 1.1 mm did not disintegrate in water regardless of the amount of the dextrin even after being stirred for 90 seconds though the granular core portion became cracked, thus failing to give favorable results.

Regarding the samples containing the wood powder, serving as a component material of the granular core portion, with a grain size of 1.1 mm to 0.6 mm and the dextrin in an amount of 4 wt % or 21 wt % with respect to the total weight of the excrement treatment material, part of the wood powder dissociated in water, but part of the granular core portion did not disintegrate even after being stirred for 90 seconds, thus failing to give favorable results.

The samples containing the wood powder serving as a component material of the granular core portion with a grain size of 1.0 mm to 0.6 mm and the dextrin in an amount of 5 wt % to 20 wt % with respect to the total weight of the excrement treatment material were dispersed in water and the whole disintegrated after being stirred for 90 seconds, thus providing favorable results. Particularly, the samples containing the wood powder with a grain size of 0.6 mm and the dextrin in an amount of 10 wt % to 20 wt % with respect to the total weight of the excrement treatment material were dispersed in water after being stirred for 60 seconds, thus providing especially favorable results.

As a result of the present test, it is clear that a grain size of a water retaining material is set to 0.6 mm or less and the amount of an adhesive is set to 5 wt % to 20 wt % with respect to the total weight of an excrement treatment material, so that the excrement treatment material having an excellent water-disintegrating performance can be implemented.

REFERENCE SIGNS LIST

S1 granulation step
S2 coating step
S3 classification step
S4 drying step

The invention claimed is:

1. An excrement treatment material comprising:
a water retaining material including bean curd lees;
an adhesive; and a water absorbing resin,
the excrement treatment material being formed in a granular shape,
wherein the water retaining material has a grain size of 0.6 mm or less, and
the adhesive is contained in an amount of 5 wt % to 20 wt % with respect to a total weight of the excrement treatment material.

2. The excrement treatment material according to claim 1, wherein the excrement treatment material comprises a granular core portion containing the water retaining material, and a coating layer portion containing the adhesive and the water absorbing resin for covering the granular core portion.

3. The excrement treatment material according to claim 1, wherein the adhesive is dextrin.

4. The excrement treatment material according to claim 2, wherein the adhesive is dextrin.

* * * * *